P. F. GALLAGHER.
STAY BOLT CONNECTION.
APPLICATION FILED JULY 13, 1915.
1,272,416.
Patented July 16, 1918.
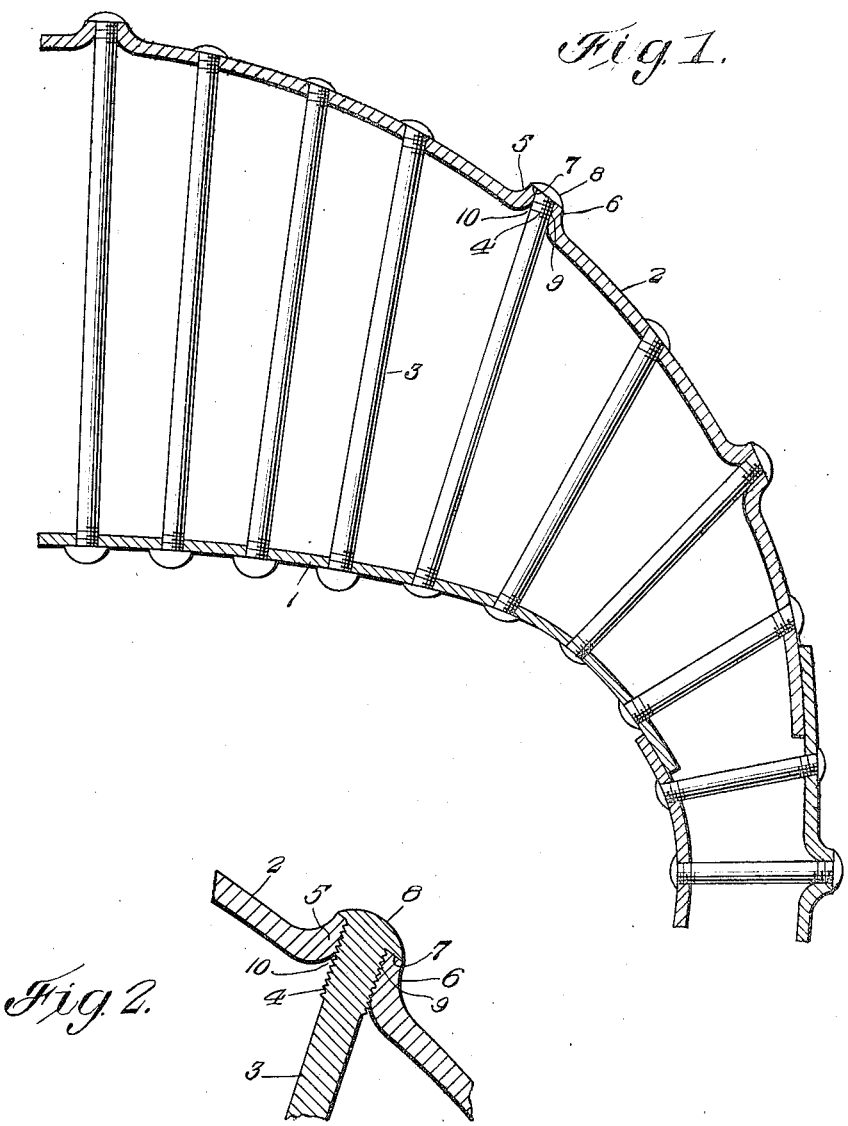

UNITED STATES PATENT OFFICE.

PETER F. GALLAGHER, OF BALTIMORE, MARYLAND, ASSIGNOR TO FLANNERY BOLT COMPANY, OF PITTSBURGH, PENNSYLVANIA, A CORPORATION OF PENNSYLVANIA.

STAY-BOLT CONNECTION.

1,272,416.  Specification of Letters Patent.  Patented July 16, 1918.

Application filed July 13, 1915. Serial No. 39,702.

*To all whom it may concern:*

Be it known that I, PETER F. GALLAGHER, a citizen of the United States, residing at Baltimore, in the State of Maryland, have invented new and useful Improvements in Stay-Bolt Connections, of which the following is a specification.

My invention relates to improvements in stay bolt connections, and particularly to an improved mode of connecting flexible stay bolts with the outside sheets or shell plates of steam boilers, one object of the invention being to provide a connection which shall be proof against leakage or breakage of the parts at the point of connection, which avoids the use of parts auxiliary to the bolt and sheet, and which allows the bolt to have ample flexibility to compensate for expansion and contraction.

A further object of the invention is to provide a construction of connections which permit substantially the same range of flexibility as a ball and socket connection, and which dispenses entirely with the use of bushings and caps and other parts liable to leak or break or which must be removed or renewed with trouble or expense at more or less frequent intervals.

The invention consists of the features of construction, combination and arrangement of parts herein fully described and claimed, reference being had to the accompanying drawing in which:—

Figure 1 is a vertical section taken through one side of a fire box and showing the application of my invention.

Fig. 2 is a sectional view, on an enlarged scale, through the outside sheet and showing the connection of one of the stay bolts therewith.

Referring to the drawing, 1 designates the inner wall, sheet or plate, 2 the outer wall, sheet or plate, and 3 the connecting stay bolts of the fire box structure of a steam boiler, the bolts being, so far as my invention is concerned, connected with the inner sheet 1 in the manner shown or in any other preferred manner.

In accordance with my invention, the outer ends of all the stay bolts 3, or any desired number of them, are screw threaded, as shown at 4, and extended through and engaged with tubular projections 5, said projections having circular portions 6 which are screw threaded for engagement with the screw threaded portions of the bolts, whereby the bolts are fastened to the outer sheet or shell. As shown, the outer extremities of the tubular projections are plane surfaced to provide seats 7 against which bear heads 8 formed upon the outer ends of the bolts.

Each tubular projection 5 is integral with the sheet 2 and punched out therefrom by the action of a suitable die. At its point of connection with the sheet the tubular projection is bell-shaped or flared, thereby providing an inwardly flaring space between the bolt and the walls of the opening 9 through which the bolt extends and which communicates with the circular or cylindrical internally threaded portion of the projection, the said flaring portion of the opening being indicated at 10. This flaring portion may provide for the reception of any suitable plastic or other yielding packing, if desired, and permits relative motion between the bolt and shell or plate, in which motion the tubular projection is permitted to partake by means of a certain degree of resiliency inherent therein.

In constructing and assembling the parts, it will be understood that the tubular projections are punched as described and the circular walls thereof internally threaded. The outer end of the bolt, when the latter is placed in position, is then inserted through the tubular projection, in which action it is threaded in place, so that the extremity of the bolt projects to the required distance beyond the seat 7. This portion of the bolt is then upset to form the head 8 which lies in close contact with the seat 7, thus providing a combined retaining and closure member which supplements the action of the threads to hold the bolt from displacement, and at the same time coöperates with the threads to firmly seal the connection against leakage.

In the use of the boiler flexibility of the bolt is permitted to compensate for expansion and contraction of the parts, first by reason of the resiliency of the connection, and second by reason of the flaring opening 10 which adapts the parts to have relative movement without undue strain upon the tubular projection. The connections between the bolt and sheet being integral with the respective elements it is obvious that a material advantage is obtained over all ordinary forms of connection, in that flexibility and a sealing action are gained without the use of any auxiliary parts whatever. Hence liability of leakage or breakage at the joint is prevented or reduced to the minimum. Furthermore, the use of bushings and caps or other parts requiring machining and adding expense to the connection is avoided, as well as the trouble and expense of replacing parts at more or less frequent intervals or of examining and tightening up elements, as is required by law and practice in the use of connections having retaining or closure caps.

I claim:—

1. In a flexible stay bolt connection, an outer sheet having a bolt opening and an integral projection punched outwardly therefrom in line with said opening, the outer internal portion of said projection being cylindrical and threaded, and the portion of the sheet around the inner end of the opening being bell-shaped or flared, and a bolt passing through the bell shaped base of the opening and provided with threads to engage the threads in the projection and also with a head to rest on the outer end of said projection.

2. In a flexible stay bolt connection, an outer sheet having a bolt opening and an integral projection punched outwardly therefrom and in line with said opening, the outer internal portion of said projection being cylindrical and threaded and the portion of the sheet around the inner end of the opening being bell-shaped or flared, and a bolt passing through said bell-shaped portion and having a threaded portion to engage the threads in the projection, the said projection having its outer end plane surfaced and said bolt being provided with an integral head bearing against said plane surface of the projection.

In testimony whereof I affix my signature in presence of two witnesses.

PETER F. GALLAGHER.

Witnesses:
P. H. CONNIFF,
S. E. FORWOOD.